(12) United States Patent
Kikuchi et al.

(10) Patent No.: US 9,237,071 B2
(45) Date of Patent: Jan. 12, 2016

(54) COMPUTER-READABLE RECORDING MEDIUM, VERIFICATION METHOD, AND VERIFICATION DEVICE

(71) Applicant: FUJITSU LIMITED, Kawasaki-shi, Kanagawa (JP)

(72) Inventors: Shinji Kikuchi, Yokohama (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 207 days.

(21) Appl. No.: 14/184,232

(22) Filed: Feb. 19, 2014

(65) Prior Publication Data

US 2014/0297827 A1    Oct. 2, 2014

(30) Foreign Application Priority Data

Mar. 28, 2013   (JP) ................... 2013-070673

(51) Int. Cl.
*G06F 15/16* (2006.01)
*H04L 12/24* (2006.01)

(52) U.S. Cl.
CPC .................. *H04L 41/0869* (2013.01)

(58) Field of Classification Search
CPC .................................................. H04L 41/0869
See application file for complete search history.

(56) References Cited

U.S. PATENT DOCUMENTS

| 2003/0005024 | A1 | 1/2003 | Grumann |
| 2004/0205411 | A1* | 10/2004 | Hong .................... G06F 21/566 714/38.1 |
| 2006/0195297 | A1 | 8/2006 | Kubota et al. |
| 2010/0115520 | A1 | 5/2010 | Kohno et al. |

FOREIGN PATENT DOCUMENTS

| EP | 1691276 A2 | 8/2006 |
| GB | 2508064 A | 5/2014 |
| JP | 11-143701 | 5/1999 |
| JP | 2003-173280 | 6/2003 |
| JP | 2004-303117 | 10/2004 |
| JP | 2005-250770 | 9/2005 |
| JP | 2006-236280 | 9/2006 |
| WO | 2010050524 | 5/2010 |
| WO | 2013042182 A1 | 3/2013 |

OTHER PUBLICATIONS

Great Britain Search Report dated Jul. 25, 2014 for corresponding Great Britain Patent Application 1403142.1, 3 pages.

* cited by examiner

*Primary Examiner* — Moustafa M Meky
(74) *Attorney, Agent, or Firm* — Fujitsu Patent Center

(57) ABSTRACT

On the basis of a possible value of a variable that is specified by a conditional sentence extracted from a script that is used for the first system configuration and on the basis of a possible value of an item in configuration information on the first system configuration, a verification device creates a first association relationship that indicates the relationship between the variable and the item. On the basis of a possible value of a variable that is specified by a conditional sentence extracted from a script that is used for a second system configuration and on the basis of a possible value of an item in configuration information on the second system configuration, the verification device creates a second association relationship between the variable and the item. The verification device extracts a difference between the first association relationship and the second association relationship.

5 Claims, 14 Drawing Sheets

FIG.3

```
foreach ( $vm in List1.txt){
  $vname = getVMM($vm); //ACQUIRE VMM ON WHICH vm IS RUNNING //CREATE SNAPSHOT
  if $vname="OS(X)" then
     exec "ssh $vname 'xe vm-snapshot $vm' ";
  if $vname="OS(K)" then
     exec "ssh $vname 'createsnapshot $vm' ";

exec "ssh $vname update $vm"; // UPDATE vm

@s_var << svrVer($vm);  //INCLUDE, IN ARRAY,
                          //PHYSICAL SERVER IN WHICH vm IS RUNNING
}
foreach($sv in @s_var)
  if $sv==2010 then {sleep(30); exec "ssh $sv reboot";}
  if $sv==2011 then {sleep(10); exec "ssh $sv reboot";}
}
```

FIG.6

PARAMETER INFORMATION ON VM

| NAME | OWNER | OS |
|---|---|---|
| VM 1 | TANAKA | OS (Cen) |
| VM 2 | OGAWA | OS (Ub) |
| VM 3 | ABE | OS (W7) |
| VM 4 | NAKAMURA | OS (Cen) |
| VM 5 | NAGAI | OS (Ub) |
| VM 6 | TAKAGI | OS (W7) |
| ... | ... | ... |

PARAMETER INFORMATION ON VMM

| NAME | IP | OS |
|---|---|---|
| VMM 1 | 192.168.10.1 | OS (X) |
| VMM 2 | 192.168.10.2 | OS (K) |
| VMM 3 | 192.168.10.3 | OS (W) |
| ... | ... | ... |

PARAMETER INFORMATION ON PHYSICAL SERVER

| NAME | REGION | MODEL |
|---|---|---|
| SERVER 1 | TOKYO | 2010 |
| SERVER 2 | TOKYO | 2011 |
| SERVER 3 | NAGOYA | 2012 |
| ... | ... | ... |

FIG.7

| OPERA-TION TARGET | OWNER | OS | DEPEN-DENCY 1: IP | DEPEN-DENCY 1: OS | DEPEN-DENCY 2: REGION | DEPEN-DENCY 2: MODEL |
|---|---|---|---|---|---|---|
| VM 1 | TANAKA | OS (Cen) | 192.168.10.1 | OS (X) | TOKYO | 2010 |
| VM 2 | OGAWA | OS (Ub) | 192.168.10.1 | OS (X) | TOKYO | 2010 |
| VM 3 | ABE | OS (W7) | 192.168.10.1 | OS (X) | TOKYO | 2010 |
| VM 4 | NAKAMURA | OS (Cen) | 192.168.10.2 | OS (K) | TOKYO | 2011 |
| VM 5 | NAGAI | OS (Ub) | 192.168.10.2 | OS (K) | TOKYO | 2011 |
| VM 6 | TAKAGI | OS (W7) | 192.168.10.2 | OS (K) | TOKYO | 2011 |

FIG.8

BEFORE UPDATE (ONE GENERATION AGO)

| VARIABLE NAME | PARAMETER NAME |
|---|---|
| $vname | instantiatedOn→OS |
| $sv | instantiatedOn→runningOn→MODEL |

AFTER UPDATE (CURRENT GENERATION)

| VARIABLE NAME | PARAMETER NAME |
|---|---|
| $vname | instantiatedOn→OS |

FIG.9

PARAMETER INFORMATION ON VM

| NAME | OWNER | OS |
|---|---|---|
| VM 1 | TANAKA | OS (Cen) |
| VM 2 | OGAWA | OS (Ub) |
| VM 3 | ABE | OS (W7) |
| VM 4 | NAKAMURA | OS (Cen) |
| VM 5 | NAGAI | OS (Ub) |
| VM 6 | TAKAGI | OS (W7) |
| ... | ... | ... |

PARAMETER INFORMATION ON VMM

| NAME | IP | OS |
|---|---|---|
| VMM 1 | 192.168.10.1 | OS (X) |
| VMM 2 | 192.168.10.2 | OS (K) |
| VMM 3 | 192.168.10.3 | OS (W) |
| ... | ... | ... |

PARAMETER INFORMATION ON PHYSICAL SERVER

| NAME | REGION | MODEL |
|---|---|---|
| SERVER 1 | TOKYO | 2010 |
| SERVER 2 | TOKYO | 2011 |
| SERVER 3 | NAGOYA | 2012 |
| ... | ... | ... |

EXTRACTION RESULT OF CONFIGURATION ITEM ON WHICH OPERATION TARGET DEPENDS

| OPERATION TARGET | DEPENDENCY 1 instantiatedOn | DEPENDENCY 2 instantiatedOn→runningOn |
|---|---|---|
| VM 1 | VMM 1 | SERVER 1 |
| VM 2 | VMM 1 | SERVER 1 |
| VM 3 | VMM 1 | SERVER 1 |
| VM 4 | VMM 2 | SERVER 2 |
| VM 5 | VMM 2 | SERVER 2 |
| VM 6 | VMM 2 | SERVER 2 |

| OPERATION TARGET | OWNER | OS | DEPENDENCY 1: IP | DEPENDENCY 1: OS | DEPENDENCY 2: REGION | DEPENDENCY 2: MODEL |
|---|---|---|---|---|---|---|
| VM 1 | TANAKA | OS (Cen) | 192.168.10.1 | OS (X) | TOKYO | 2010 |
| VM 2 | OGAWA | OS (Ub) | 192.168.10.1 | OS (X) | TOKYO | 2010 |
| VM 3 | ABE | OS (W7) | 192.168.10.1 | OS (X) | TOKYO | 2010 |
| VM 4 | NAKAMURA | OS (Cen) | 192.168.10.2 | OS (K) | TOKYO | 2011 |
| VM 5 | NAGAI | OS (Ub) | 192.168.10.2 | OS (K) | TOKYO | 2011 |
| VM 6 | TAKAGI | OS (W7) | 192.168.10.2 | OS (K) | TOKYO | 2011 |

COMPUTER-READABLE RECORDING MEDIUM, VERIFICATION METHOD, AND VERIFICATION DEVICE

CROSS-REFERENCE TO RELATED APPLICATION

This application is based upon and claims the benefit of priority of the prior Japanese Patent Application No. 2013-070673, filed on Mar. 28, 2013, the entire contents of which are incorporated herein by reference.

FIELD

The embodiments discussed herein are directed to a verification program, a verification method, and a verification device.

BACKGROUND

In recent years, with the popularization of cloud computing, an information and communication technology (ICT) system becomes complicated and the size of the system becomes large. The cost of the system can be reduced, on the user side, by reducing the use cost due to economies of scale or by outsourcing the operation management task of servers.

On the corporation side that operates a data center, a large number of users can be accommodated in a large-scale data center; however, the system operation management becomes complicated. Consequently, by scripting the same operation, such as the operation of applying a patch or shutting down a server, performed on devices that have the same configuration, the efficiency of the system operation management is improved. Furthermore, when the same operation is performed on devices that have different configurations, the number of scripts to be prepared increases because commands are different.

Consequently, there is a known technology as follows. Namely, an abstraction script is prepared in which a command is described by using the abstraction principle to a level in which a difference between devices can be hided. Then, when the abstraction script is executed, the abstraction command is converted into a specific description in accordance with the conversion rule that is described on the basis of the setting or the configuration of the operation target.

Patent Document 1: International Publication Pamphlet No. WO 2010/050524

However, with the technology described above, when a change occurs in the configuration of a device on which the script is executed, it is not able to determine the verification of the conversion rule of the abstraction script; therefore, there is a problem in that it is not able to determine whether the abstraction script can be used.

Furthermore, it is conceivable that the verification is visually determined. However, in a complicated system, because the conversion rule of abstract script also becomes complicated, an oversight of the checking occurs, and thus the reliability thereof is low.

SUMMARY

According to an aspect of the embodiments, a non-transitory computer-readable recording medium stores therein a verification program that causes a computer to execute a process. The process includes creating, on the basis of a possible value of a variable that is specified by a conditional sentence extracted from a script that is used for a first system configuration and on the basis of a possible value of an item in configuration information on the first system configuration, a first association relationship that indicates the relationship between the variable and the item; creating, on the basis of a possible value of a variable that is specified by a conditional sentence extracted from a script that is used for a second system configuration that is different from the first system configuration and on the basis of a possible value of an item in configuration information on the second system configuration, a second association relationship that indicates the relationship between the variable and the item; and extracting a difference between the first association relationship and the second association relationship.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a schematic diagram illustrating an example of a script stored in a script DB;

FIG. 6 is a schematic diagram illustrating an example of configuration items stored in a configuration item DB;

FIG. 7 is a schematic diagram illustrating an example of information stored in an extraction result DB;

FIG. 8 is a schematic diagram illustrating an example of information stored in an association relationship DB;

FIG. 9 is a schematic diagram illustrating an example of extracting the dependency relation obtained before the system configuration has not been changed;

DESCRIPTION OF EMBODIMENTS

Preferred embodiments of the present invention will be explained with reference to accompanying drawings. The present invention is not limited to these embodiments.

[a] First Embodiment

Overall Configuration

Figure 1:
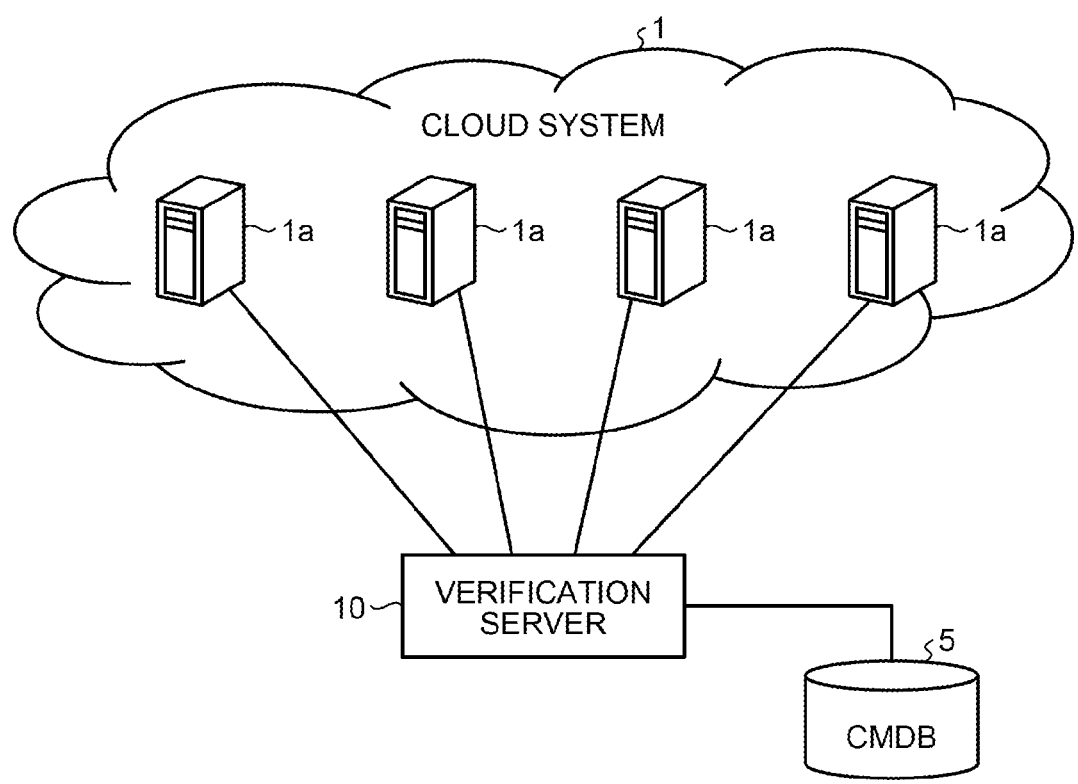
FIG. 1 is a schematic diagram illustrating an example of the overall configuration of a system according to a first embodiment.

FIG. 1 is a schematic diagram illustrating an example of the overall configuration of a system according to a first embodiment. As illustrated in FIG. 1, the system includes a cloud system 1, a configuration management database (CMDB) 5, and a verification server 10.

The cloud system 1 is an example of a system that accommodates therein multiple data centers that include multiple physical servers 1a and that provides users with, for example, virtual machines (VMs). The CMDB 5 is an example of a database that stores therein the configurations of configuration items (CI) that constitute the cloud system 1. For example, the CMDB 5 stores therein the relationships between the physical servers running in the cloud system 1 and the virtual machines running in the physical server.

The verification server 10 is an example of a server device that verifies the validity of scripts that are executed on the physical servers or the virtual machines in the cloud system 1. On the basis of a possible value of a variable, which is specified by a conditional sentence extracted from a script that is used for a first system configuration, and on the basis of a possible value of an item, which is stored in configuration information on the first system configuration, the verification server 10 creates a first association relationship that indicates the relationship between the variable and the item. Then, on the basis of a possible value of a variable, which is specified by a conditional sentence extracted from a script that is used for a second system configuration that is different from the first system configuration, and on the basis of a possible value of an item, which is stored in configuration information on the second system configuration, the verification server 10 creates a second association relationship that indicates the relationship between the variable and the item. Then, the verification server 10 extracts the difference between the first association relationship and the second association relationship.

As described above, before and after a change in the configuration of the system that is targeted for execution of a script, the verification server 10 can create, on the basis of a possible value of a conditional sentence of a script and on the basis of a possible value of an item stored in configuration information, the association relationship between a variable and an item and then determine, from the difference between the association relationships, whether the script can be used. Consequently, the verification server 10 can determine a script in which a command is described by using the abstraction principle can be used.

Functional Configuration

Figure 2:
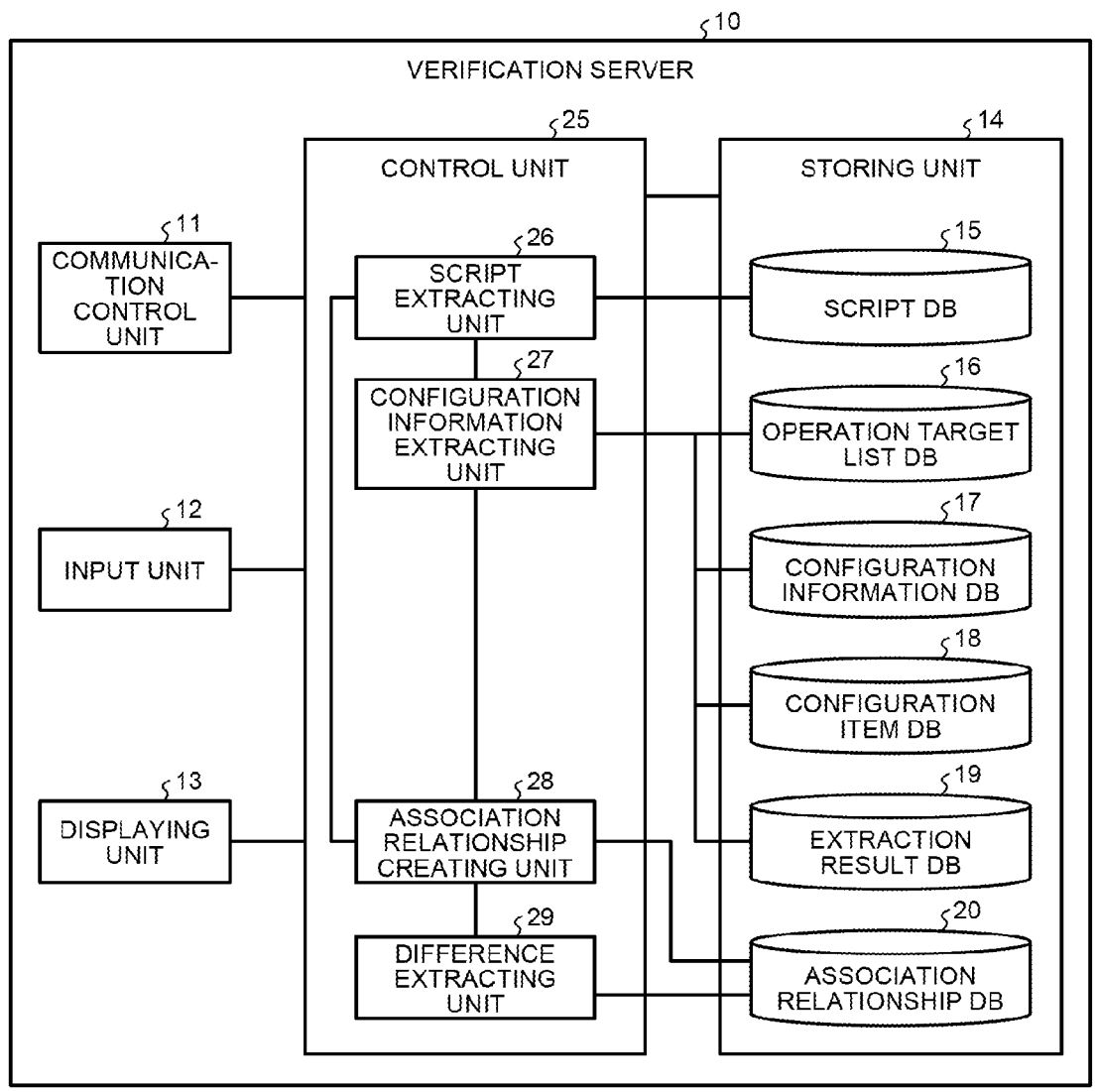
FIG. 2 is a functional block diagram illustrating a verification server according to the first embodiment.

FIG. 2 is a functional block diagram illustrating a verification server according to the first embodiment. As illustrated in FIG. 2, the verification server 10 includes a communication control unit 11, an input unit 12, a displaying unit 13, a storing unit 14, and a control unit 25.

The communication control unit 11 is a processing unit, such as a network interface, that controls communication with another device. The input unit 12 is a processing unit, such as a mouse or a keyboard, that receives an instruction operation from a user or the like. The displaying unit 13 is a processing unit, such as a display or a touch panel, that displays various kinds of information.

The storing unit 14 is a storage device, such as a memory or a semiconductor element. The storing unit 14 includes a script DB 15, an operation target list DB 16, a configuration information DB 17, a configuration item DB 18, an extraction result DB 19, and an association relationship DB 20.

The script DB 15 is a database that stores therein a script that is executed by the cloud system 1. For example, the script DB 15 stores therein a script that is an abstraction script and that has the concrete rule for creating a concrete command in accordance with the system to be executed.

FIG. 3 is a schematic diagram illustrating an example of a script stored in a script DB. As illustrated in FIG. 3, the script stored in the script DB is a script used to apply a patch. The name of the script is "patch1". This script, first, reads an operation target list (List1); acquires a VM to be operated; and then acquires a virtual machine manager (VMM) in which the VM is operated. Then, the script acquires a snapshot of each of the VMs by using the VMM. At this point, for an OS (X) in this script, the script executes a command represented by "xe vm-snapshot command". For an OS (K) in this script, the script executes a command represented by "createsnapshot command".

Then, the script creates an update of each of the VMs and reboots a physical server. Specifically, due to the performance constraint, a 2010 model device stops its operation for 30 seconds and then reboots its operation. A 2011 model device stops its operation for 10 seconds and then reboots its operation. At this point, a description of creating a snapshot or a description of defining reboot becomes the concrete rule in the script.

Figure 4:
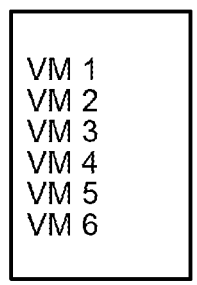
FIG. 4 is a schematic diagram illustrating an example of the list stored in an operation target list DB.

The operation target list DB 16 is a database that stores therein the list of VMs that are targeted for operation due to a script. Specifically, the operation target list DB 16 is updated by an administrator or the like. Furthermore, the VMs stored operation target list DB 16 are targets executed by a script. FIG. 4 is a schematic diagram illustrating an example of the list stored in an operation target list DB. As illustrated in FIG. 4, the operation target list DB 16 stores therein a VM 1, a VM 2, a VB 3, a VM 4, a VM 5, and a VM 6. Specifically, the VMs 1 to 6 are currently specified as the targets executed by a script.

Figure 5:
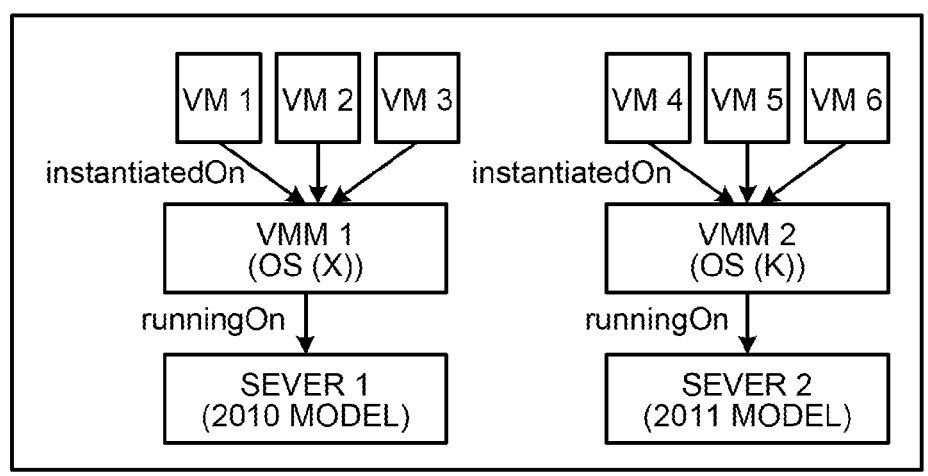
FIG. 5 is a schematic diagram illustrating an example of configuration information stored in a configuration information DB.

The configuration information DB 17 is a database that stores therein configuration information on the cloud system 1. The information stored in the configuration information DB 17 may also be the same information as that stored in the CMDB 5. Alternatively, target information may be extracted from the CMDB 5 and then be stored in the configuration information DB 17. FIG. 5 is a schematic diagram illustrating an example of configuration information stored in a configuration information DB.

As illustrated in FIG. 5, the configuration information DB 17 stores therein the dependency relation of the physical servers, the VMMs, and the VMs as the dependency relation of the configuration items that are running in the cloud system 1. For example, the configuration information DB 17 stores therein information indicating that the VMM 1 running on the OS (X) is operated in the 2010 model Server 1 and indicating that the VM 1, the VM 2, and the VM 3 are running on the VMM 1. Similarly, the configuration information DB 17 stores therein information indicating that the VMM 2 running on the OS (K) is operated in the 2011 model Server 2 and indicating that the VM 4, the VM 5, and the VM 6 are running on the VMM 2.

Specifically, the VM 1, the VM 2, and the VM 3 have the relationship represented by "InstantiatedOn" with respect to the VMM 1. The VMM 1 has the relationship represented by "runningOn" with respect to the Server 1. Similarly, the VM 4, the VM 5, and the VM 6 have the relationship represented by "InstantiatedOn" with respect to the VMM 2. The VMM 2 has the relationship represented by "runningOn" with respect to the Server 2.

The configuration item DB 18 is a database that stores therein information on the configuration items running in the cloud system 1. The information stored in the configuration item DB 18 may also be the same information as that stored in the CMDB 5. Alternatively, target information may also be extracted from the CMDB 5 and be stored in the configuration item DB 18. FIG. 6 is a schematic diagram illustrating an example of configuration items stored in a configuration item DB.

As illustrated in FIG. 6, the configuration item DB 18 stores therein possible values obtained by the configuration items of the VMs, the VMMs, and the physical servers. Specifically, the configuration item DB 18 stores therein, as parameter information on a VM, a combination of the "Name, Owner, and OS". The "Name" mentioned here is the name of a VM, the "Owner" is the name of a user who uses the VM, and the "OS" is the name of the operating system (OS) running on the VM. The example illustrated in FIG. 6 indicates that the OS (Cen) is running on the VM 1 that is used by the user whose name is Tanaka.

Furthermore, the configuration item DB 18 stores therein a combination of the "Name, IP, and OS" as the parameter information on a VMM. The "Name" mentioned here is the name of a VMM, the "IP" is an Internet Protocol (IP) address that uses the VM, and the "OS" is the name of the OS on which the VMM is running. The example illustrated in FIG. 6 indicates that 192.168.10.1 is allocated in the VMM 1 that is running on the OS (X).

Furthermore, the configuration item DB 18 stores therein, as the parameter information on a physical server, a combination of the "Name, Region, and Model". The "Name" mentioned here is the name of a physical server, the "Region" is information that indicates the region in which the physical server is installed, and the "Model" is information that indicates the model year of the physical server. The example illustrated in FIG. 6 indicates that the Server 1 is installed in Tokyo and is a physical server of 2010 year model.

A description will be given here by referring back to FIG. 2. The extraction result DB 19 is a database that stores therein the extraction result of the dependency relations between the configuration items in the cloud system 1. The information in the extraction result DB 19 is created by a configuration information extracting unit 27, which will be described later. FIG. 7 is a schematic diagram illustrating an example of information stored in an extraction result DB.

As illustrated in FIG. 7, the extraction result DB 19 stores therein, in an associated manner, a combination of "operation target, Owner, OS, dependency 1:IP, dependency 1:OS, dependency 2:Region, and dependency 2:Model". Specifically, the extraction result DB 19 stores therein the dependency relation of each of the operation targets.

The "operation target" mentioned here corresponds to the operation target list stored in the operation target list DB 16. The "Owner" and the "OS" correspond to the parameter information on the VM in the configuration information DB 17. The "dependency 1" indicates the information that has a first dependency relation with a VM that is targeted for the operation. In this example, this corresponds to the parameter information on the VMM in the configuration information DB 17. The "dependency 2" indicates the information that has a second dependency relation with a VM that is targeted for the operation. In this example, this corresponds to the parameter information on the physical server in the configuration information DB 17.

Specifically, for the VM targeted for the operation, the extraction result DB 19 indicates that the first dependency relation is the IP address and the OS and indicates that the second dependency relation is the Region and the Model. The example illustrated in FIG. 7 indicates that the "VM 1" targeted for the operation is the virtual machine used by Tanaka and indicates that the OS (Cen) is running. the extraction result DB 19 indicates that the "VM 1" depends on the "IP address" parameter and the "OS" parameter in the relationship represented by "dependency 1:InstantiatedOn". Specifically, the "VM 1" depends on the "IP address:192.168.10.1" and the "OS:OS (X)" in the relationship represented by "dependency 1:InstantiatedOn". Furthermore, the "VM 1" depends on the "Region" parameter and the "Model" parameter in the relationship represented by "dependency 2:runningOn". Specifically, the "VM 1" depends on the "Region: Tokyo" and the "Model:2010" in the relationship represented by "dependency 2:runningOn".

The association relationship DB 20 is a database that stores therein the association relationship created from a possible value of a variable, which is specified by a conditional sentence extracted from a script, and a possible value of an item, which is stored in the configuration information. Furthermore, the association relationship DB 20 stores therein the association relationship for each generation. For example, the association relationship DB 20 stores therein a first generation association relationship obtained before the system configuration has not been changed and the second generation association relationship obtained after the system configuration has been changed.

FIG. 8 is a schematic diagram illustrating an example of information stored in an association relationship DB. As illustrated in FIG. 8, the association relationship DB stores therein the first generation association relationship and the second generation association relationship. The association relationship DB stores therein, in an associated manner, a combination of the "variable name and parameter name". The "variable name" indicates a variable name specified by the conditional sentence extracted from a script. The "parameter name" indicates the item in the configuration information and indicates the dependency relation thereof. By associating a "script name", the association relationship DB 20 may also stores therein the association relationship for each script.

FIG. 8 is a schematic diagram illustrating an example of information stored in an association relationship DB. The first generation illustrated in FIG. 8 indicates that the variable represented by "$vname" is associated with "InstantiatedOn→OS" that is specified by the dependency relation in the configuration information. Specifically, FIG. 8 illustrates that, before the system configuration is changed, i.e., in the first generation, the value defined by the variable represented by "$vname" in the script name in the patch1 is associated with the value that is set in the "OS" in the relationship represented by "dependency 1:InstantiatedOn" for the "VM", which is targeted for the operation, from among the dependency relations in the extracted configuration information. Similarly, before the system configuration is changed, the variable represented by "$sv" is associated with the relationship represented by "InstantiatedOn→runningOn→Model" that is specified by the dependency relation in the configuration information.

Furthermore, the second generation illustrated in FIG. 8 indicates that the variable represented by "$vname" is associated with "InstantiatedOn→OS" that is specified by the dependency relation in the configuration information. Specifically, after the system configuration has been changed, the value defined by the variable represented by "$vname" of the script name in the patch1 is associated with the value that is set in the "OS" in the relationship represented by "dependency 1:InstantiatedOn" for the "VM", which is targeted for the operation, from among the dependency relations in the extracted configuration information.

A description will be given here by referring back to FIG. 2. The control unit 25 includes a script extracting unit 26, the configuration information extracting unit 27, an association relationship creating unit 28, and a difference extracting unit 29. For example, the control unit 25 is an electronic circuit, such as a central processing unit (CPU) or the like. Each of the processing units are implemented by a program or the like that is executed by the control unit 25.

The script extracting unit 26 is a processing unit that extracts a possible value of a variable that is specified by the conditional sentence extracted from a script that is used for the first system configuration. Specifically, when an instruction is received from an administrator, when the configuration information on the script or the system is changed, or when the timing reaches an arbitrary timing, such as a periodic timing, the script extracting unit 26 extracts a script from the script DB 15. Then, the script extracting unit 26 extracts a possible value of a variable that is specified by the conditional sentence in the concrete rule in the script and then outputs the possible value to the association relationship creating unit 28.

For example, in the example illustrated in FIG. 3, the script extracting unit 26 extracts, from the conditional sentence in the created snapshot, the "OS (X)" and the "OS (K)" as possible values of the variable name "$vname". Furthermore, the script extracting unit 26 extracts, from the conditional sentence when reboot is executed, "2010" and "2011" as the possible values of the variable name "$sv".

The configuration information extracting unit 27 is a processing unit that extracts a possible value of an item stored in the configuration information on the system configuration. Specifically, at the same timing as that performed by the script extracting unit 26, the configuration information extracting unit 27 refers to the operation target list DB 16, the configuration information DB 17, and the configuration item DB 18 and then creates information that is to be stored in the extraction result DB 19.

FIG. 9 is a schematic diagram illustrating an example of extracting the dependency relation obtained before the system configuration has not been changed. As illustrated in FIG. 9, when the timing reaches a predetermined timing, the configuration information extracting unit 27 extracts the VM 1, the VM 2, the VB3, the VM 4, the VM 5, and the VM 6 from the operation target list DB 16. Then, the configuration information extracting unit 27 extracts, from each of the VMs in the operation target list and from the dependency relation of each of the configuration items stored in the configuration information DB 17, a configuration item on which each of the VM targeted for the operation depends. For example, the configuration information extracting unit 27 extracts the combination of "VM 1, VMM 1, and Server 1" or the combination of "VM 2, VMM 1, and Server 1" as the relationship represented by "operation target, dependency 1:InstantiatedOn, and dependency 2: InstantiatedOn→runningOn". Specifically, the configuration information extracting unit 27 extracts the relationship that indicates which VM is running on a VMM in a physical server in the operation target list.

Then, for each of the VMs targeted for the operation, the configuration information extracting unit 27 associates the parameter information on the VMs, on the VMMs, and on the physical servers, which are stored in the configuration information DB 17. For example, for the "VM 1" targeted for the operation, first, the configuration information extracting unit 27 extracts the information indicating that the "VM 1" depends on the configuration item of the "VMM 1" in the relationship represented by "dependency 1:InstantiatedOn" and extracts the information indicating that the "VM 1" depends on the configuration item of the "Server 1" in the relationship represented by "dependency 2:InstantiatedOn→runningOn".

Then, the configuration information extracting unit 27 associates the combination of "Name(VM 1), Owner (Tanaka), and OS (OS (Cen))" of the VM 1 with the combination of "IP (192.168.10.1) and OS (OS (X))" of the VMM 1. Furthermore, the configuration information extracting unit 27 associates the combination of "Name (VM 1), Owner (Tanaka), and OS (OS (Cen))" of the VM 1 with the combination of "Region (Tokyo) and Model (2010)" of the Server 1. In this way, the configuration information extracting unit 27 specifies the VMM and the Server to which the VM that is targeted for the operation belongs; associates the operating environment of a physical server and the VMM, in which VMs are running, with each of the VMs; and then extracts the associated information. Thereafter, the configuration information extracting unit 27 stores the extracted information in the extraction result DB 19 and notifies the association relationship creating unit 28 that the extracting process has been ended.

The association relationship creating unit 28 is a processing unit that creates the association relationship that is created from a possible value of a variable specified by the conditional sentence extracted from the script and a possible value of an item stored in the configuration information. Specifically, by referring to the information that is input from the script extracting unit 26 and by referring to the information stored in the extraction result DB 19, the association relationship creating unit 28 creates an association relationship and stores the created association relationship in the association relationship DB 20.

Figure 10:
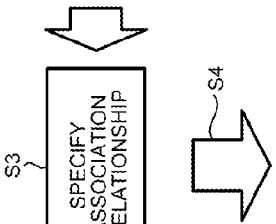
FIG. 10 is a schematic diagram illustrating an example of creating the association relationship obtained before the system configuration has not been changed.

FIG. 10 is a schematic diagram illustrating an example of creating the association relationship obtained before the system configuration has not been changed. The association relationship creating unit 28 receives, from the script extracting unit 26, the combination of "$vname, OS (X), and OS (K)" and the combination of "$sv, 2010, and 2011" as a combination of "variable name and possible value" (Step S1).

Furthermore, the association relationship creating unit 28 refers to the extraction result stored in the extraction result DB 19 and then extracts a combination of "parameter name and possible value" (Step S2). For example, the association relationship creating unit 28 extracts, as a possible value of the "Owner", the combination represented by "Tanaka, Ogawa, Abe, Nakamura, Nagai, and Takagi". Furthermore, the association relationship creating unit 28 extracts, as a possible value of "OS", the combination represented by "OS (Cen), OS (Ub), and OS (W7)".

Furthermore, the association relationship creating unit 28 extracts, as a possible value of the combination of "dependency 1:InstantiatedOn related to the IP", the combination of "192.168.10.1 and 192.168.10.2" and extracts, as the possible value of the relationship between the "dependency 1:InstantiatedOn related to the OS", the combination of the "OS (X) and OS (K)". Furthermore, the association relationship creating unit 28 extracts "Tokyo" as a possible value of the combination of the possible value of the combination of the "dependency 1:InstantiatedOn and dependency 2: runningOn related to the Region" and extracts the combination of "2010 and 2011" as the possible value of the combination of "dependency 1: InstantiatedOn and dependency 2:runningOn related to the Model".

Then, the association relationship creating unit 28 compares the combination of "variable name and possible value" extracted from the script with the combination of "parameter name and possible value" extracted from the configuration information and then creates an association relationship (Step S3). Specifically, the association relationship creating unit 28 extracts the combination of "parameter name and possible value" that matches the combination of "variable and possible value" that is extracted from the script. At this point, the association relationship creating unit 28 may also extract information that completely match or may also extract the combination of "parameter name and possible value" that includes the combination of "variable name and possible value".

For example, the association relationship creating unit 28 specifies the combination of "dependency 1:InstantiatedOn related to the OS" as the parameter name of the configuration information that includes the possible values "OS (X) and OS (K)" of the variable name "$vname" in the script. Similarly, the association relationship creating unit 28 specifies the combination of "dependency 1:InstantiatedOn and dependency 2:runningOn related to the Model" as the parameter name of the configuration information that includes the possible values "2010 and 2011" of the variable name "$sv" in the script.

Then, the association relationship creating unit 28 associates the variable name "$vname" in the script with the parameter name, i.e., the combination of "dependency 1:InstantiatedOn related to the OS", in the configuration information. Furthermore, the association relationship creating unit 28 associates the variable name "$sv" in the script with the parameter name, i.e., the combination of "dependency 1:InstantiatedOn and dependency 2:runningOn related to the Model" in the configuration information. Thereafter, the association relationship creating unit 28 stores, in the association relationship DB 20, the association relationship represented by "$vname, dependency 1:InstantiatedOn, and the OS" and the association relationship represented by "$sv, dependency 1:InstantiatedOn, dependency 2:runningOn, and the Model" (Step S4).

The difference extracting unit 29 is a processing unit that extracts the difference between the first generation association relationship and the second generation association relationship stored in the association relationship DB 20. Specifically, the difference extracting unit 29 compares the association relationship that was created before the system configuration has not been changed and the association relationship that is created after the system configuration has been changed and then detects a variation in the association relationship. Then, the difference extracting unit 29 allows the displaying unit 13 to display a warning in accordance with the presence or absence of a difference.

Specific Example

In the following, a description will be given, by using a specific example, of a case of creating and comparing the association relationship obtained before the system configuration has not been changed and the association relationship obtained after the system configuration has been changed. A description will be given with the assumption that the script illustrated in FIG. 3 is used and with the assumption that the process of creating the association relationship obtained before the system configuration has not been changed is the same as that described with reference to FIGS. 3 to 10. Thus, it is assumed that, as the first generation association relationship obtained before the system configuration has not been changed, the association relationship represented by "$vname and dependency 1:InstantiatedOn related to the IP" and the association relationship represented by "$sv, dependency 1:InstantiatedOn and dependency 2:runningOn related to the Model" have already been created.

System after the Configuration has been Changed

Figure 11:
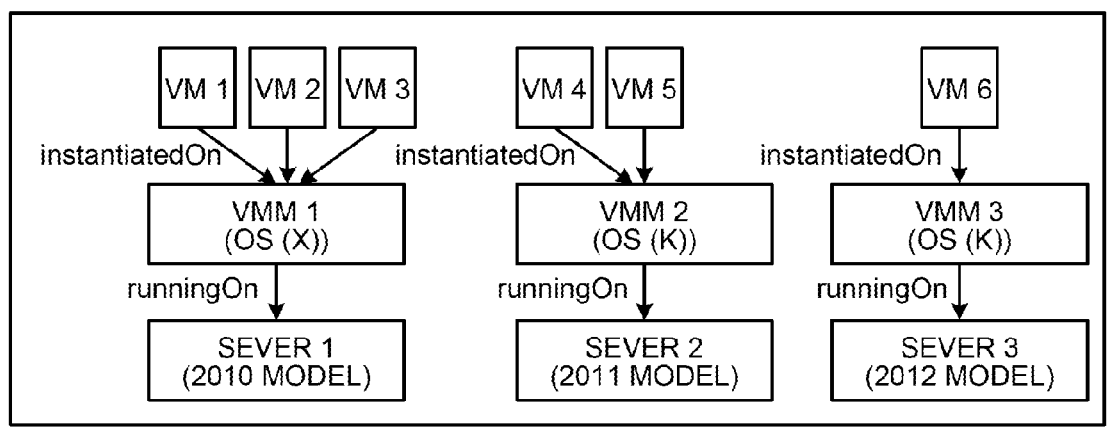
FIG. 11 is a schematic diagram illustrating an example of configuration information obtained after the system configuration has been changed.

In the following, a description will be given of creating the association relationship obtained after the system configuration has been changed. FIG. 11 is a schematic diagram illustrating an example of configuration information obtained after the system configuration has been changed. As illustrated in FIG. 11, the configuration information DB 17 stores therein the dependency relation of a configuration item obtained after the system configuration of the cloud system 1 has been changed. For example, the configuration information DB 17 stores therein information indicating that the VMM 1 operated by the OS (X) is running on the 2010 model Server 1 and indicating that the VM 1, the VM 2, and the VM 3 are running on the VMM 1. Similarly, the configuration information DB 17 stores therein information indicating that the VMM 2 operated by the OS (K) is running on the 2011 model Server 2 and indicating that the VM 4 and the VM 5 are running on the VMM 2. Similarly, the configuration information DB 17 stores therein information indicating that the VMM 3 operated by the OS (K) is running on the 2012 model Server 3 and indicating that the VM 6 is running on the VMM 2.

Specifically, the VM 1, the VM 2, and the VM 3 have the relationship of "InstantiatedOn" with respect to the VMM 1 and the VMM 1 has the relationship of "runningOn" with respect to the Server 1. Similarly, the VM 4 and the VM 5 have the relationship of "InstantiatedOn" with respect to the VMM 2 and the VMM 2 has the relationship of "runningOn" with respect to the Server 2. Similarly, the VM 6 has the relationship of "InstantiatedOn" with respect to the VMM 3 and the VMM 3 has the relationship of "runningOn" with respect to the Server 3.

When comparing the system configuration before the change illustrated in FIG. 5 with the system configuration after the change illustrated in FIG. 11, the configuration has been changed such that a physical server "Server 3" is additionally installed. Furthermore, the "VMM 3" is running on the additionally installed Server 3 and the "VM 6" is running on the "VMM 3" instead of the "VMM 2".

Operation Target after the Configuration Change

Figure 12:
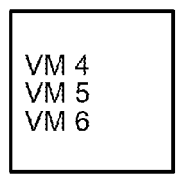
FIG. 12 is a schematic diagram illustrating the list of VMs of the operation target list obtained after the system configuration has been changed.

In the following, a description will be given of the operation target list obtained after the system configuration has been changed. FIG. 12 is a schematic diagram illustrating the list of VMs of the operation target list obtained after the system configuration has been changed. As illustrated in FIG. 12, after the system configuration has been changed, the VM 4, the VM 5, and the VM 6 are specified, by an administrator or the like, the operation target for a script. The VM 4, the VM 5, and the VM 6 are stored in the operation target list DB 16 obtained after the system configuration has been changed.

Dependency Relation after the Configuration Change

Figure 13:
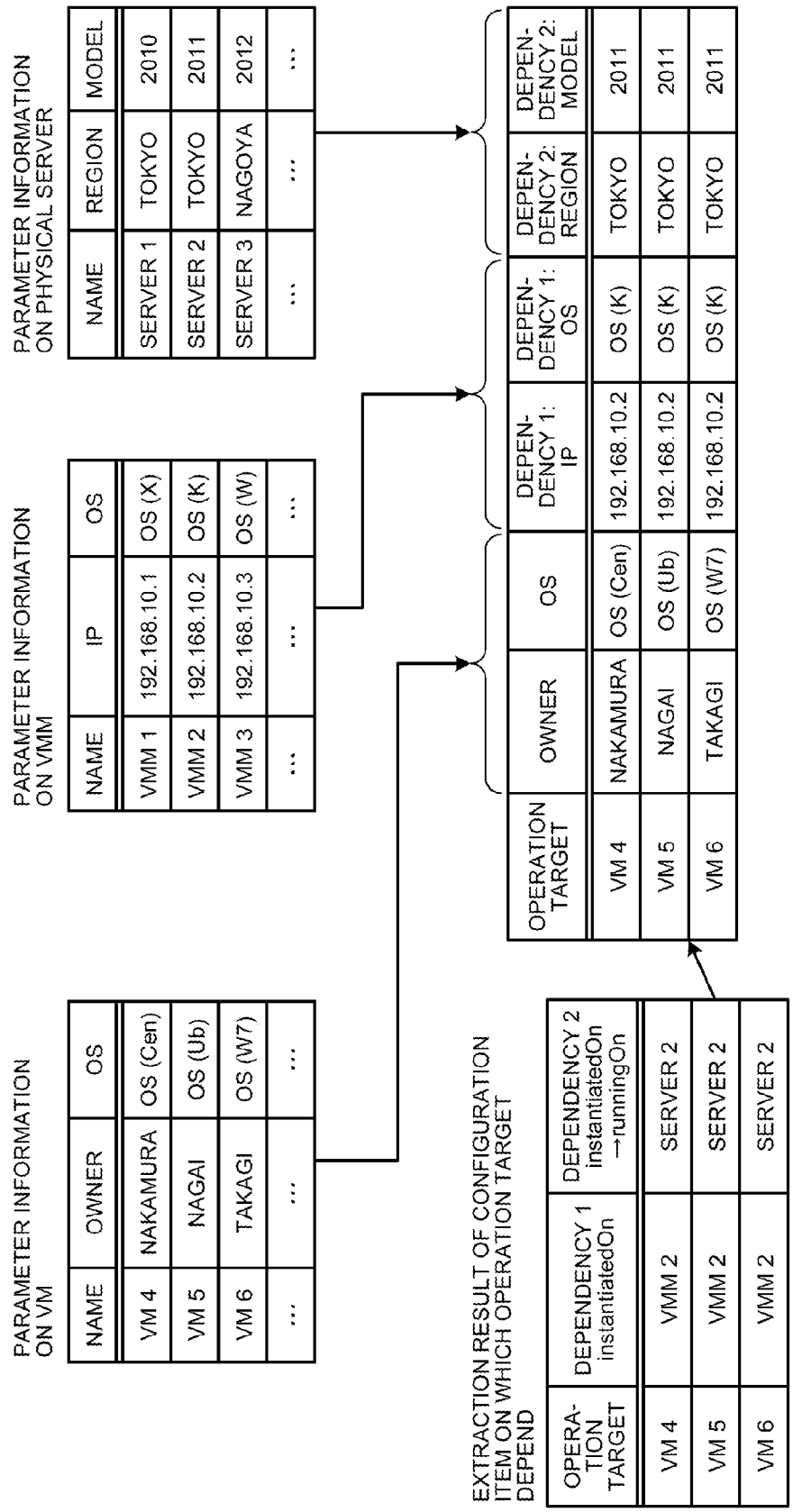
FIG. 13 is a schematic diagram illustrating an example of extracting the dependency relation obtained after the system configuration has been changed.

In this state, the configuration information extracting unit 27 extracts the dependency relation obtained after the system configuration has been changed. FIG. 13 is a schematic diagram illustrating an example of extracting the dependency relation obtained after the system configuration has been changed. As illustrated in FIG. 13, the configuration information extracting unit 27 extracts the VM 4, the VM 5, and the VM 6 from the operation target list DB 16. Then, from the VMs in the operation target list and from the dependency relation of the configuration items stored in the configuration information DB 17, the configuration information extracting unit 27 extracts, configuration items on which the VMs in the operation target list depend. For example, the configuration information extracting unit 27 extracts the combination of "VM 4, VMM 2, and Server 2", the combination of "VM 5, VMM 2, and Server 2", and the combination of "VM 6, VMM 2, and Server 2" as the combination represented by "operation target, dependency 1:InstantiatedOn, dependency 2:InstantiatedOn→runningOn".

Then, for the VMs of the operation target, the configuration information extracting unit 27 associates the parameter information on the VMs, on the VMM, and on the physical servers that are stored in the configuration information DB 17. For example, for the "VM 4" targeted for the operation, first, the configuration information extracting unit 27 extracts the information indicating that the "VM 4" depends on the configuration item of the "VMM 2" in the relationship represented by "dependency 1:InstantiatedOn" and extracts the information indicating that the "VM 4" depends on the configuration item of the "Server 2" in the relationship represented by "dependency 2:InstantiatedOn→runningOn".

Then, the configuration information extracting unit 27 associates the combination of "Name (VM 4), Owner (Nakamura), and OS (OS (Cen))" of the VM 4 with the combination of "IP (192.168.10.2) and OS (OS (K))" of the VMM 2. Furthermore, the configuration information extracting unit 27 associates the combination of "Name (VM 4), Owner (Nakamura), and OS (OS (Cen))" of the VM 4 with the combination of "Region (Tokyo) and Model (2011)" of the Server 2. In this way, the configuration information extracting unit 27 specifies the VMM and the Server to which the VM that is targeted for the operation after the system configuration has been changed belongs; associates the operating environment of a VMM, in which VMs are running, and a physical server with each of the VMs; and then extracts the information. Thereafter, the configuration information extracting unit 27 stores the extracted information in the extraction result DB 19 and notifies the association relationship creating unit 28 that the extracting process has been ended.

Extracting the Association Relationship Obtained after the Configuration Change

Figure 14:
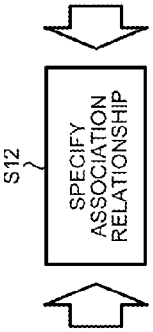
FIG. 14 is a schematic diagram illustrating an example of creating the association relationship obtained after the system configuration has been changed.

FIG. 14 is a schematic diagram illustrating an example of creating the association relationship obtained after the system configuration has been changed. The association relationship creating unit 28 receives, from the script extracting unit 26, the combination of "$vname, OS (X), and OS (K)" and the combination of "$sv, 2010, and 2011" as the combination of "variable name and possible value" (Step S10).

Subsequently, the association relationship creating unit 28 refers to the extraction result after the change of the system configuration and then extracts the combination of "parameter name and possible value" (Step S11). Specifically, the association relationship creating unit 28 extracts, as the possible value of the "Owner", the combination of "Nakamura, Nagai, and Takagi". Furthermore, the association relationship creating unit 28 extracts, as the possible value of "OS", the combination of "OS (Cen), OS (Ub), and OS (W7)".

Furthermore, the association relationship creating unit 28 extracts "192.168.10.2" as the possible value of the relationship between the combination of "dependency 1:InstantiatedOn related to the IP" and then extracts "OS (K)" as the possible value of the combination of "dependency 1:InstantiatedOn related to the OS". Furthermore, the association relationship creating unit 28 extracts "Tokyo" as the possible value of the combination of "dependency 1:InstantiatedOn and dependency 2:runningOn related to the Region" and extracts the combination of "2011 and 2012" as the possible value of the combination of "dependency 1:InstantiatedOn and dependency 2:runningOn related to the Model".

Then, the association relationship creating unit 28 creates an association relationship obtained after the system configuration has been changed (Step S12). For example, the association relationship creating unit 28 specifies the combination of "dependency 1:InstantiatedOn related to the OS" as the parameter name of the configuration information that includes the possible values "OS (X) and OS (K)" of the variable name "$vname" in the script. Similarly, for the possible values "2010 and 2011" of the variable name "$sv" in the script, the association relationship creating unit 28 determines that no parameter name of the target configuration information is present.

Because the possible values of the parameter name, i.e., the combination of "dependency 1:InstantiatedOn and dependency 2:runningOn related to the Model", of the configuration information are "2011 and 2012", the variable name "$sv" does not include the possible values "2010 and 2011" in the script. Consequently, the association relationship creating unit 28 stores, in the association relationship DB 20, the association relationship "$vname, dependency 1:InstantiatedOn related to the OS" as the second generation association relationship (Step S13).

Figure 15:
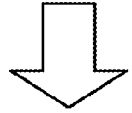
FIG. 15 is a schematic diagram illustrating an example of extracting a difference between the association relationships.

Comparison between the association relationships obtained before and after the change in the system configuration FIG. 15 is a schematic diagram illustrating an example of extracting a difference between the association relationships. As illustrated in FIG. 15, the difference extracting unit 29 compares the first generation association relationship obtained before the system configuration has not been changed (Step S4 illustrated in FIG. 10) with the second generation association relationship obtained after the system configuration that has been changed (Step S13 illustrated in FIG. 14).

Consequently, the difference extracting unit 29 determines that the first generation association relationship "$sv, dependency 1:InstantiatedOn, and dependency 2:runningOn related to the Model" obtained before the system configuration has not been changed is not present in the second generation association relationship obtained after the system configuration that has been changed. Thus, the difference extracting unit 29 allows the displaying unit 13 to display a warning indicating, for example, that "the combination related to the variable $sv in the script patch1 may possibly imperfect!". At this point, the difference extracting unit 29 may allow the displaying unit 13 to display specific information as reference information.

Flow of a Process

Figure 16:
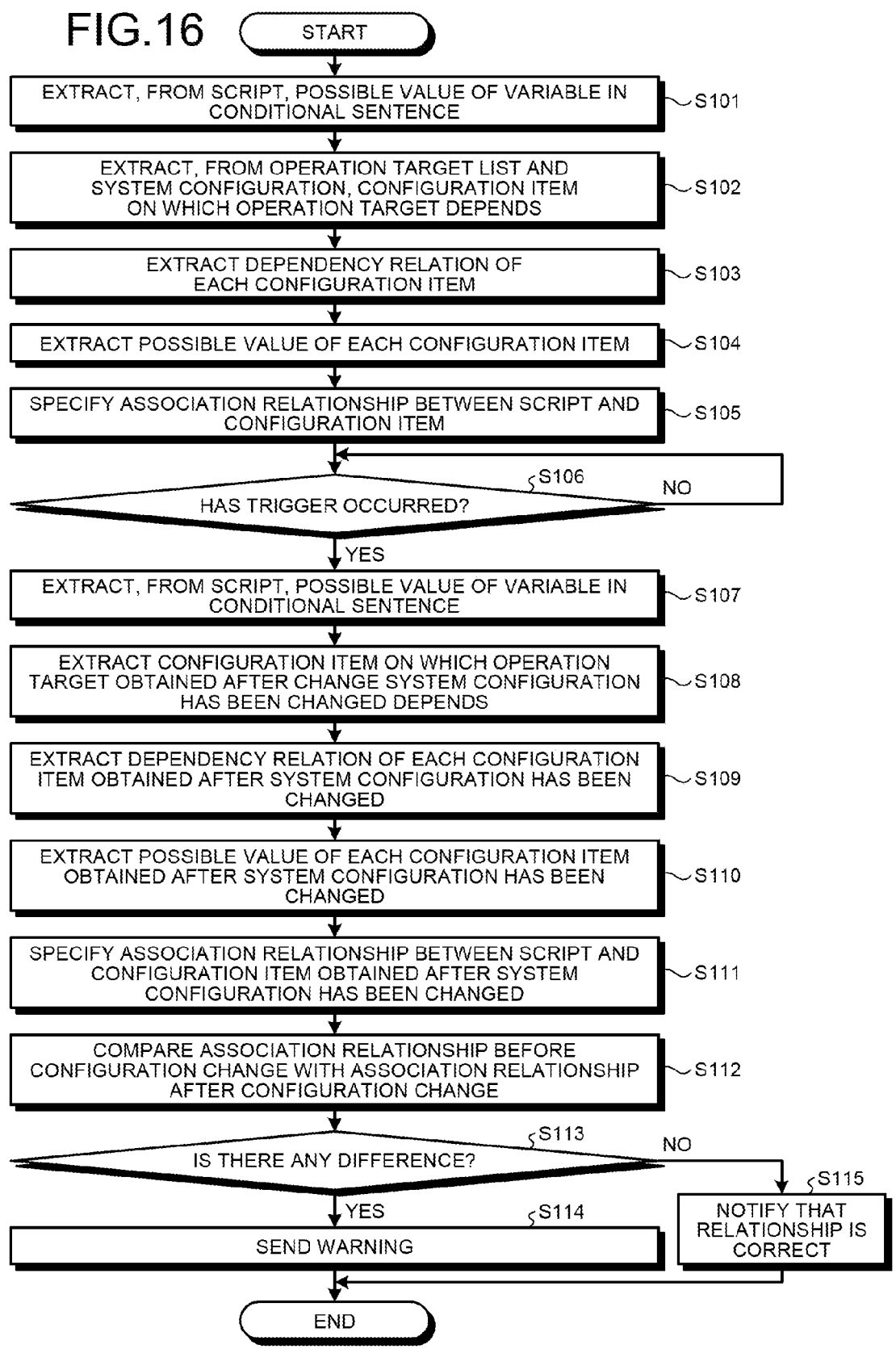
FIG. 16 is a flowchart illustrating a process according to the first embodiment.

FIG. 16 is a flowchart illustrating a process according to the first embodiment. As illustrated in FIG. 16, the script extracting unit 26 reads a script that is targeted for the verification from the script DB 15 and then extracts a possible value of a variable in the conditional sentence (Step S101).

Then, by using the operation target list stored in the operation target list DB 16 and by using the system configuration stored in the configuration information DB 17, the configuration information extracting unit 27 extracts a configuration item on which the operation target depends (Step S102).

Then, by using the configuration item extracted at Step S102 and by using the information stored in the configuration item DB 18, the configuration information extracting unit 27 extracts the dependency relation of each of the configuration items (Step S103). Subsequently, the configuration information extracting unit 27 extracts, from the dependency relation of each of the configuration items created at Step S103, a possible value of each of the configuration items and stores the extracted value in the extraction result DB 19 (Step S104).

Thereafter, the association relationship creating unit 28 compares the possible value of the variable in the script extracted at Step S101 with the possible value of each of the configuration items stored in the extraction result DB 19 and then specifies the association relationship between the script and the configuration item (Step S105). Specifically, the association relationship creating unit 28 creates the first generation association relationship obtained before the system configuration has not been changed and then stores the created data in the association relationship DB 20.

In this way, the association relationship obtained before the system configuration has not been changed is created. Then, when a predetermined trigger occurs, such as a change in the system configuration (Yes at Step S106), the configuration information extracting unit 27 reads, from the script DB 15, the script that is targeted for the verification and then extracts the possible value of the variable in the conditional sentence (Step S107).

Subsequently, by using the operation target list stored in the operation target list DB 16 and by using the system configuration that has been changed and that is stored in the configuration information DB 17, the configuration information extracting unit 27 extracts a configuration item on which the operation target depends (Step S108).

Then, by using the configuration item extracted at Step S108 and by using the information that is stored in the configuration item DB 18 and that is obtained after the configuration has been changed, the configuration information extracting unit 27 extracts the dependency relation of the configuration items obtained after the system configuration has been changed (Step S109). Subsequently, the configuration information extracting unit 27 extracts, from the dependency relation of each of the configuration items created at Step S109, a possible value of each of the configuration items obtained after the system configuration has been changed and then stores the value in the extraction result DB 19 (Step S110).

Then, the association relationship creating unit 28 compares the possible value of the variable in the script extracted at Step S107 with the possible value of each of the configuration items stored in the extraction result DB 19 and specifies the association relationship between the script and each of the configuration items obtained after the system configuration has been changed (Step S111). Specifically, the association relationship creating unit 28 creates the second generation association relationship obtained after the system configuration has been changed and then stores the created relationship in the association relationship DB 20.

Then, the difference extracting unit 29 compares the first generation association relationship obtained before the system configuration has not been changed with the second generation association relationship obtained after the system configuration has been changed (Step S112). If the comparison result indicates that there is a difference between the relationship (Yes at Step S113), the difference extracting unit 29 notifies the displaying unit 13 or the like of a warning (Step S114). In contrast, if the comparison result indicates that there is no difference between the relationship (No at Step S113), the difference extracting unit 29 notifies the displaying unit 13 or the like that the relationship is correct (Step S115).

As described above, the verification server 10 according to the first embodiment can extract, on the basis of the dependency relation information on the configuration items of the system configuration stored in the configuration information database, a configuration item that is the operation target for a script, the parameter type of the depended configuration item, and the value of the configuration item. Furthermore, the verification server 10 compares a combination of values of the parameter with a combination of character strings in an if-sentence in a script and predicts the association relationship between a variable in the script and the parameter type of the configuration item. Then, when the verification server 10 executes the same script on the same configuration item or another configuration item, the verification server 10 can again predict the association relationship between the script and the parameter type.

Furthermore, because the verification server 10 extracts a possible value of a variable in a concrete rule, such as an if-sentence, in a script, if there is a difference between the association relationships, the verification server 10 can detect that the concrete rule is imperfect. Consequently, the verification server 10 can easily specify an imperfect portion, thus reducing the time taken for correction.

When the verification server 10 compares the association relationships between before and after a change, if the association relationship that was established before has not been established any more, the verification server 10 determines that the combination becomes imperfect and alerts a system administrator before a script is executed. Furthermore, because the verification server 10 can detect an imperfection before the script is executed, the verification server 10 can suppress a malfunction that occurs after the script has been executed. Furthermore, because the verification server 10 can automatically detect a malfunction of a script that can be used in a cloud system made up of elements with a complicated configuration, the verification server 10 can suppress an oversight of the checking due to a visual check.

[b] Second Embodiment

In the above explanation, a description has been given of the embodiment according to the present invention; however, the embodiment is not limited thereto and can be implemented with various kinds of embodiments other than the embodiment described above. Therefore, another embodiment will be described below.

Script

In the first embodiment, a description has been given of an example of a script to which a patch is applied; however, the embodiment is not limited thereto. For example, the same process may also be used for a script, such as backing up, that is periodically executed.

(System)

Furthermore, of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings can be arbitrarily changed unless otherwise stated.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

Hardware

Figure 17:
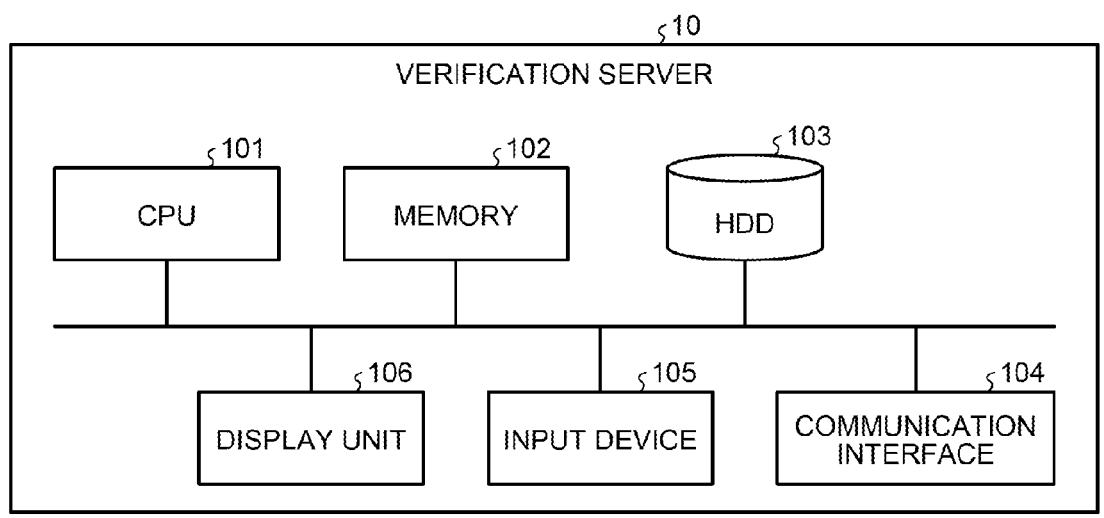
FIG. 17 is a schematic diagram illustrating an example of the hardware configuration of the verification server.

FIG. 17 is a schematic diagram illustrating an example of the hardware configuration of the verification server. As illustrated in FIG. 17, the verification server 10 includes a CPU 101, a memory 102, a hard disk drive (HDD) 103, a communication interface 104, an input device 105, and a display unit 106. Furthermore, the units illustrated in FIG. 17 are connected by a bus or the like with each other.

The HDD 103 stores therein the DBs and programs that operate the functions illustrated in FIG. 2. The HDD 103 is mentioned as an example of a recording medium; however, the embodiment is not limited thereto. For example, various programs may also be stored in another computer readable recording medium, such as a read only memory (ROM), a RAM, a CD-ROM, or the like and may also be read by a computer. Furthermore, a program may also be obtained and used by arranging a storage medium at a remote site and by a computer accessing the storage medium. Furthermore, at this time, the obtained program may also be stored in the recording medium in the computer.

The communication interface 104 is a network interface card or the like. The input device 105 is, for example, a keyboard; the display unit 106 is, for example, a display unit, such as a touch panel, a display, or the like, that displays various kinds of information.

The CPU 101 reads, from the HDD 103 or the like, the programs that execute the same processes as those performed by the processing units illustrated in FIG. 2 and loads the programs in the memory 102, and thus the programs operate the processes that execute the functions described in FIG. 2 or the like. Specifically, the processes execute the same processes as those performed by the verification server 10. Specifically, the CPU 101 read, from the HDD 103 or the like, the programs that have the same function as those performed by the script extracting unit 26, the configuration information extracting unit 27, the association relationship creating unit 28, and the difference extracting unit 29. Then, the CPU 101 executes the process that executes the same process as that performed by each of the processing units.

In this way, by reading and executing the program, the verification server 10 operates as an information processing apparatus that executes the verification method. Furthermore, the verification server 10 reads the programs described above from the recording medium by a media reader and executes the read program, thereby implementing the same function described in the embodiment. The program mentioned in the second embodiment is not limited to the program executed by the verification server 10. For example, the present invention may also be used in a case in which another computer or a server executes the program or in which another computer or a server cooperatively executes the program with each other.

According to an aspect of the embodiments of the present invention, an advantage is provided in that it is possible to determine whether a script described using an abstraction command can be used.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a verification program that causes a computer to execute a process comprising:
    first creating, on the basis of a possible value of a variable that is specified by a conditional sentence extracted from a script that is used for a first system configuration and on the basis of a possible value of an item in configuration information on the first system configuration, a first association relationship that indicates the relationship between the variable and the item;
    second creating, on the basis of a possible value of a variable that is specified by a conditional sentence extracted from a script that is used for a second system configuration that is different from the first system configuration and on the basis of a possible value of an item in configuration information on the second system configuration, a second association relationship that indicates the relationship between the variable and the item; and
    extracting a difference between the first association relationship and the second association relationship.

2. The non-transitory computer-readable recording medium according to claim 1, wherein
    the first creating includes creating, on the basis of a possible value of a variable that is specified by a conditional sentence in a concrete rule for creating a concrete command in accordance with a system that is targeted for execution specified in the script and on the basis of the possible value of the item in the configuration information on the first system configuration, the first association relationship that indicates the relationship between the variable and the item,
    the second creating includes creating, on the basis of the possible value of the variable that is specified by the conditional sentence in the concrete rule and on the basis of the possible value of the item in the configuration information on the second system configuration, the second association relationship that indicates the relationship between the variable and the item, and
    the extracting includes extracting, in accordance with the difference between the first association relationship and the second association relationship, an imperfection of the concrete rule.

3. The non-transitory computer-readable recording medium according to claim 1, wherein the extracting includes extracting, from the combination of the variable and the item included in the second association relationship, a combination of the variable and the item that is not included in the first association relationship.

4. A verification method comprising:
    creating, on the basis of a possible value of a variable that is specified by a conditional sentence extracted from a script that is used for a first system configuration and on the basis of a possible value of an item in configuration information on the first system configuration, a first association relationship that indicates the relationship between the variable and the item, using a processor;
    creating, on the basis of a possible value of a variable that is specified by a conditional sentence extracted from a script that is used for a second system configuration that is different from the first system configuration and on the basis of a possible value of an item in configuration information on the second system configuration, a second association relationship that indicates the relationship between the variable and the item, using the processor; and extracting a difference between the first association relationship and the second association relationship, using the processor.

5. A verification device comprising:
a memory; and
a processor that is connected to the memory, wherein
the processor executes a process including:
creating, on the basis of a possible value of a variable that is specified by a conditional sentence extracted from a script that is used for a first system configuration and on the basis of a possible value of an item in configuration information on the first system configuration, a first association relationship that indicates the relationship between the variable and the item, creating, on the basis of a possible value of a variable that is specified by a conditional sentence extracted from a script that is used for a second system configuration that is different from the first system configuration and on the basis of a possible value of an item in configuration information on the second system configuration, a second association relationship that indicates the relationship between the variable and the item, and extracting a difference between the first association relationship and the second association relationship.

* * * * *